US006832775B1

(12) United States Patent
Muller

(10) Patent No.: US 6,832,775 B1
(45) Date of Patent: Dec. 21, 2004

(54) TRAILER HITCH CUSHION

(76) Inventor: Robert E. Muller, 560 Lake June Rd., Lake Placid, FL (US) 33852

( * ) Notice: Subject to any disclaimer, the term of this patent is extended or adjusted under 35 U.S.C. 154(b) by 0 days.

(21) Appl. No.: 10/246,549

(22) Filed: Sep. 17, 2002

(51) Int. Cl.$^7$ .................................................. B60D 1/60
(52) U.S. Cl. ....................................................... 280/507
(58) Field of Search ................................ 280/507, 727, 280/770; D12/162; 150/166

(56) References Cited

U.S. PATENT DOCUMENTS

| 3,596,926 | A | * | 8/1971 | Randall | 280/507 |
| 4,181,320 | A | * | 1/1980 | Wellborn, Jr. | 280/507 |
| 5,533,743 | A | * | 7/1996 | Bello | 280/507 |
| 5,775,722 | A | * | 7/1998 | Moore et al. | 280/727 |
| 6,039,339 | A | * | 3/2000 | Bello | 280/507 |
| 6,322,094 | B1 | * | 11/2001 | Poe | 280/507 |
| 6,412,806 | B1 | * | 7/2002 | Peacock | 280/507 |

* cited by examiner

Primary Examiner—Lesley D. Morris
Assistant Examiner—Daniel Yeagley

(57) ABSTRACT

A trailer hitch cushion assembly that includes a foam cover structure having a fastener provided along a split opening section thereof and having a cavity therein of sufficient size and shape to receive the hitch shaft portion and trailer connecting ball portion of a trailer hitch; the cover being constructed from a resilient foam having a brightly colored fabric outer cover and having weather-proof fasteners such as plastic snaps and/or hook and pile fasteners and one or more safety chain securing attachments that are securable to the safety chain of the hitch to secure the safety chain in place.

6 Claims, 2 Drawing Sheets

TRAILER HITCH CUSHION

TECHNICAL FIELD

The present invention relates to safety equipment and more particularly to a trailer hitch cushion assembly that includes a foam cover structure having a fastener provided along a split opening section thereof and having a cavity therein of sufficient size and shape to receive the hitch shaft portion and trailer connecting ball portion of a trailer hitch; the cover being constructed from a resilient foam having a brightly colored fabric outer cover and having weather-proof fasteners such as plastic snaps and/or hook and pile fasteners and one or more safety, chain securing attachments that are securable to the safety chain of the hitch to secure the safety chain in place.

BACKGROUND ART

It is often dangerous to keep a trailer hitch installed on a vehicle as the trailer hitch shaft portion extends outward back past the rear bumper of the vehicle and has a large trailer connecting ball at the end thereof. It is, therefore, easy for individuals to accidentally bump into the hitch shaft portion causing injuries such as cuts, bruises, scrapes, knee injuries, and the like. It would be desirable, therefore, to have a resilient cover for covering the hitch shaft portion and the trailer connection ball which would cushion any contact between a person and these items. It would be further desirable if the cover were constructed from a material that was cushioned, weather resistant, and colored such that a user's eyes would be drawn to the existence of the outwardly projecting trailer hitch thereby eliminating any contact whatsoever.

GENERAL SUMMARY DISCUSSION OF INVENTION

It is thus an object of the invention to provide a trailer hitch cushion assembly that includes a foam cover structure having a fastener provided along a split opening section thereof and having a cavity therein of sufficient size and shape to receive the hitch shaft portion and trailer connecting ball portion of a trailer hitch; the cover being constructed from a resilient foam having a brightly colored fabric outer cover and having weather-proof fasteners such as plastic snaps and/or hook and pile fasteners and one or more safety chain securing attachments that are securable to the safety chain of the hitch to secure the safety chain in place.

Accordingly, a trailer hitch cushion assembly is provided. The trailer hitch cushion assembly includes a foam cover structure having a fastener provided along a split opening section thereof and having a cavity therein of sufficient size and shape to receive the hitch shaft portion and trailer connecting ball portion of a trailer hitch; the cover being constructed from a resilient foam having a brightly colored fabric outer cover and having weather-proof fasteners such as plastic snaps and/or hook and pile fasteners and one or more safety chain securing attachments that are securable to the safety chain of the hitch to secure the safety chain in place.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
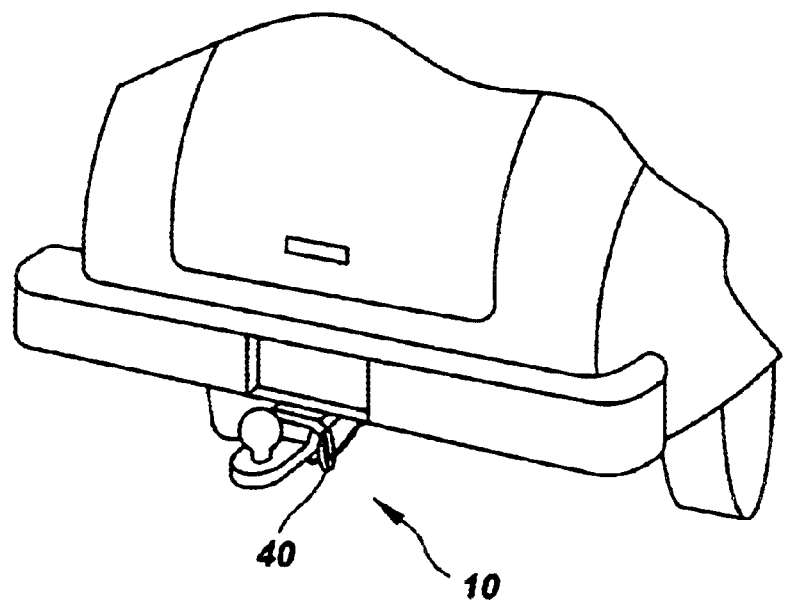
FIG. 1 is a perspective view of an exemplary embodiment of the trailer hitch cushion assembly in connection with a trailer hitch extended from the back of a representative SUV.
Figure 2:
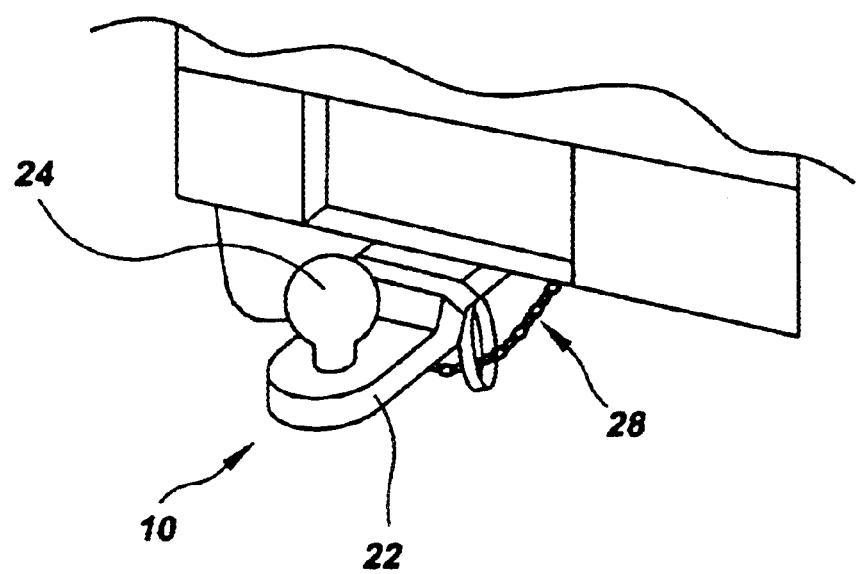
FIG. 2 depicts a conventional trailer hitch to which the cushion according to the present invention is secured.
Figure 3:
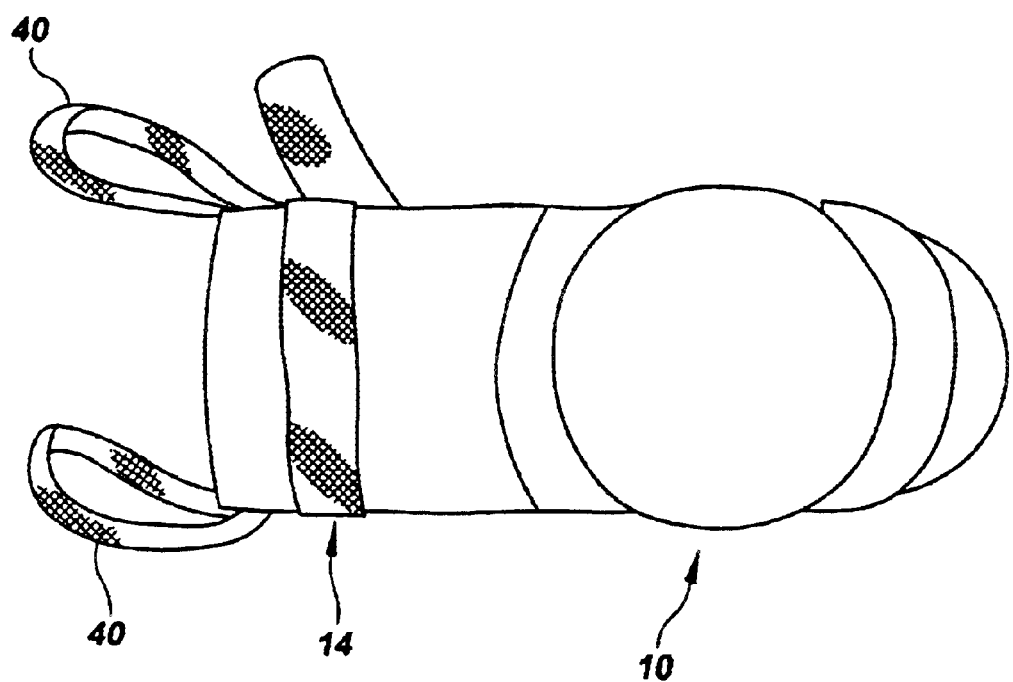
FIG. 3 is a top plan view showing the trailer hitch cushion assembly including the chain hook straps and the securing strap.
Figure 4:
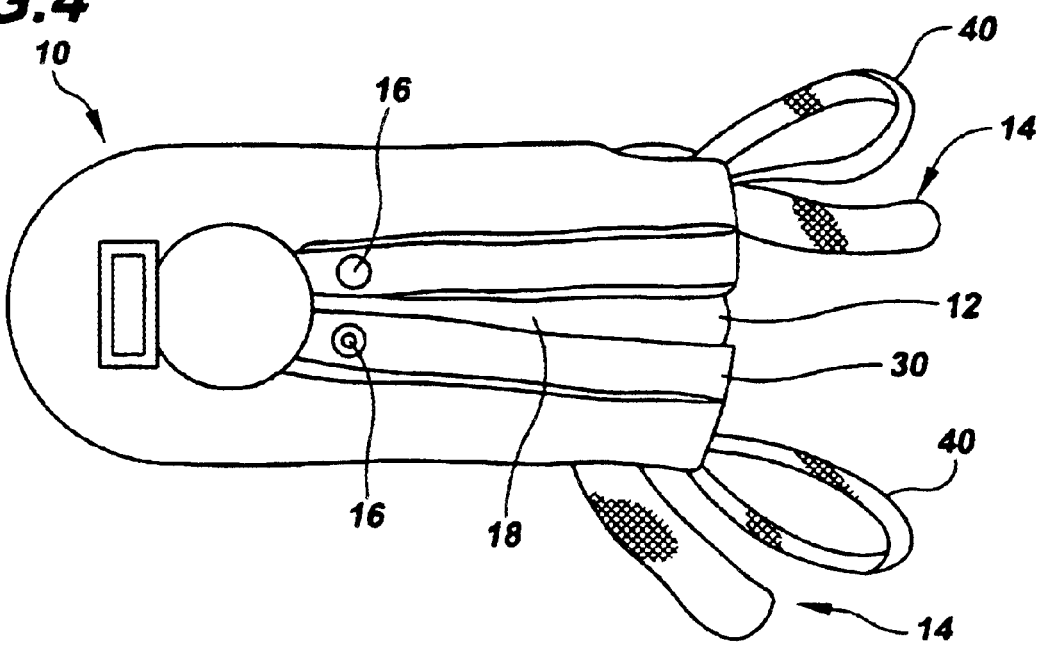
FIG. 4 is a bottom view of the trailer hitch cushion assembly showing the additional plastic snap fasteners.

FIGS. 1–4 show various aspects of an exemplary embodiment of the trailer hitch cushion assembly of the present invention generally designated 10. Trailer hitch cushion assembly 10 includes a foam cover structure, generally designated 12, having a fastener strap 14 and a plastic snap 16 provided along a split opening section 18 thereof and having a cavity therein of sufficient size and shape to receive the hitch shaft portion 22 and trailer connecting ball portion 24 of a trailer hitch, generally designated 28. The cover structure 12 being constructed from a resilient foam having a brightly purple colored fabric outer cover 30 and two safety chain securing attachment loop straps 40 that are securable to the safety chain hook of the hitch 28 to secure the safety chain hook in place.

It can be seen from the preceding description that a trailer hitch cushion assembly has been provided.

It is noted that the embodiment of the trailer hitch cushion assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer hitch cushion comprising a hollow foam enclosure having an elongated trailer hitch shaft receiving portion and a bulbous trailer hitch ball receiving portion at a rear end thereof, said enclosure further including a lower surface and an upper surface with a longitudinal separable seam extending along the lower surface, said separable seam defined by a pair of free edges;

a first fastener positioned adjacent one of said free edges;

a mating second fastener positioned adjacent the other of said free edges which is attachable to said first fastener to secure said enclosure about a trailer hitch wherein said enclosure includes a front edge having a pair of loops depending therefrom to which a trailer hitch safety chain is attached to further secure said enclosure.

2. The trailer hitch cushion according to claim 1 wherein said first and second fasteners are snaps.

3. The trailer hitch cushion according to claim 2 further comprising an opening on the lower surface of said enclosure, said opening in communication with said bulbous trailer hitch ball receiving portion thereby providing access to a trailer hitch ball attachment nut.

4. The trailer hitch cushion according to claim 3 further comprising:

a pair of straps depending from said enclosure, each strap having a mating attachment means thereon for joining said straps whereby said straps are wrapped about the enclosure and joined to further secure said enclosure to a trailer hitch.

5. The trailer hitch cushion according to claim 4 wherein said attachment means are hook and loop fasteners.

6. The trailer hitch cushion according to claim 2 wherein said enclosure includes a brightly colored exterior surface.

* * * * *